(No Model.) 2 Sheets—Sheet 2.
H. BLACKMAN.
APPARATUS FOR AND PROCESS OF RECOVERING ALKALI.
No. 478,981. Patented July 19, 1892.
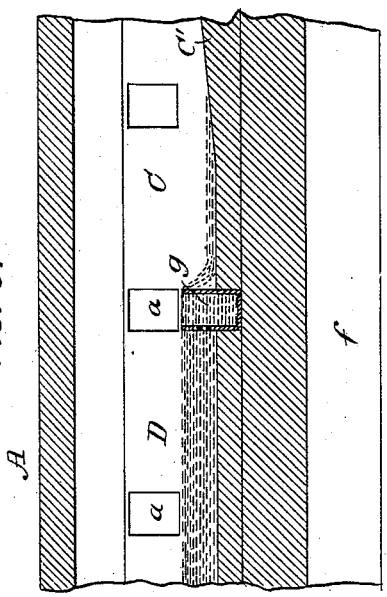
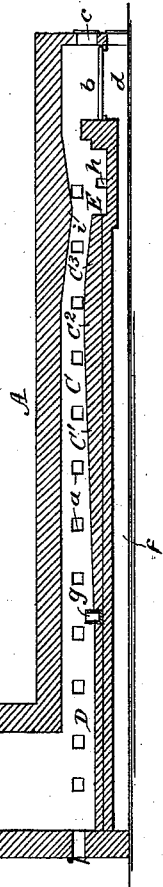
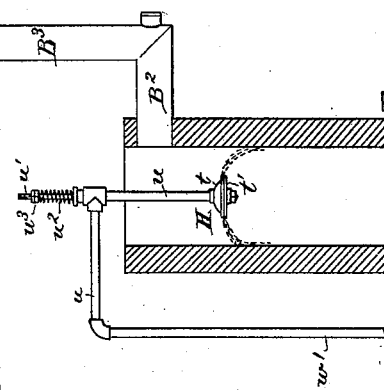
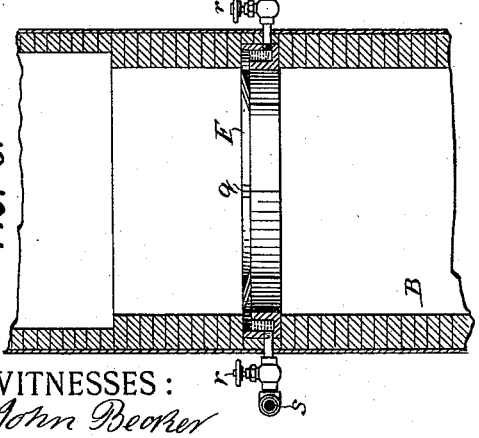
WITNESSES:
John Becker
C. K. Fraser.
INVENTOR:
Henry Blackman,
By his Attorneys,
Arthur C. Fraser & Co.

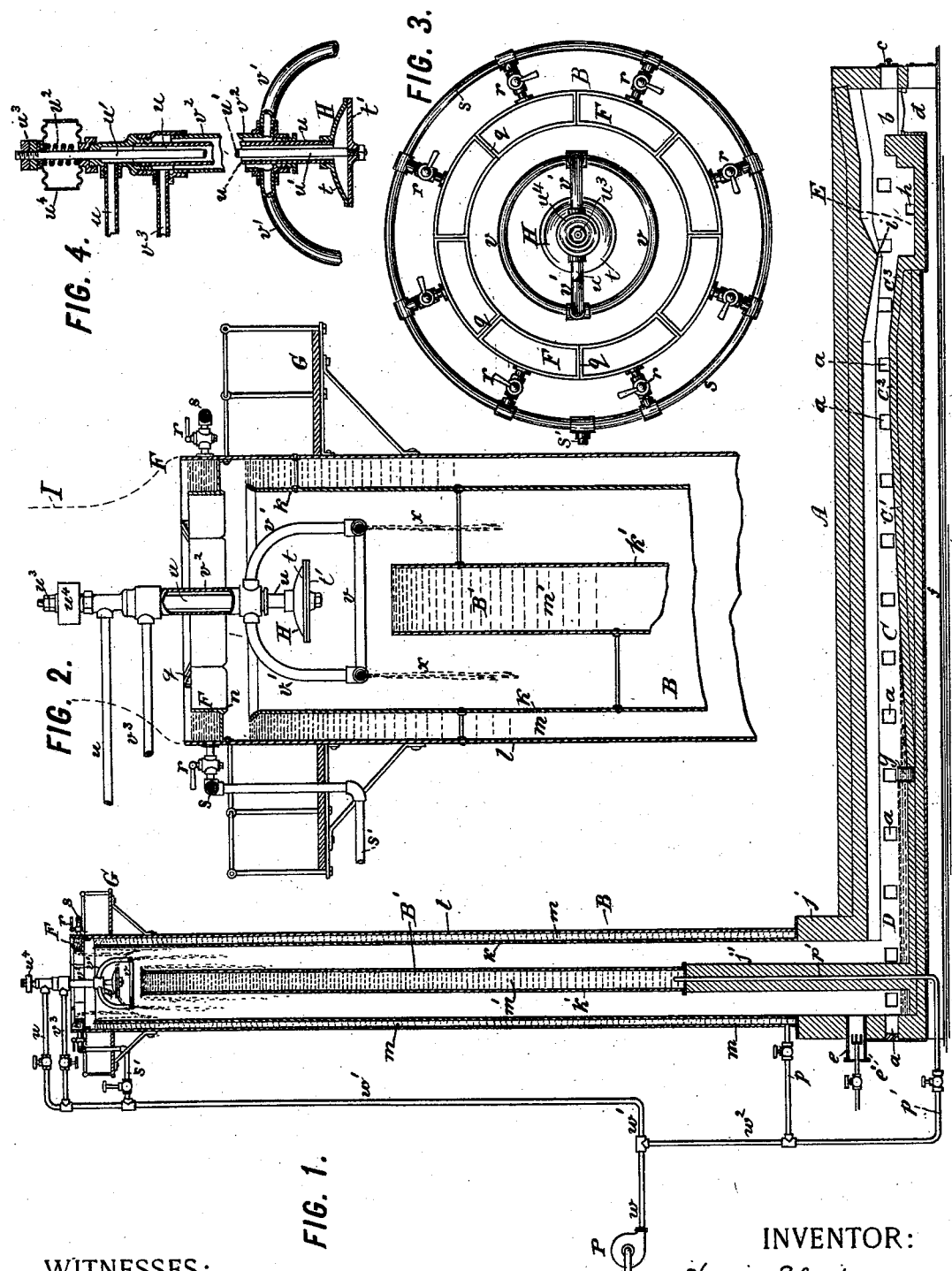

United States Patent Office.

HENRY BLACKMAN, OF NEW YORK, N. Y.

APPARATUS FOR AND PROCESS OF RECOVERING ALKALI.

SPECIFICATION forming part of Letters Patent No. 478,981, dated July 19, 1892.

Application filed December 12, 1889. Serial No. 333,503. (No model.)

*To all whom it may concern:*

Be it known that I, HENRY BLACKMAN, a citizen of the United States, residing in New York city, in the county and State of New York, have invented certain new and useful Improvements in the Process of and Apparatus for Evaporating and Calcining Alkaline and other Solutions, of which the following is a specification.

This invention relates to the treatment of refuse soda-liquors of wood-pulp mills, as well as other alkaline, basic, or other substances, from solutions thereof by means of the evaporation of the solution and calcination of the resulting residuum in a calcining-furnace.

In calcining-furnaces as heretofore used it is customary to first evaporate the free water or other volatile constituents from the alkaline or other solutions by exposing the latter to the heat of the furnace, and subsequently when the material has been reduced to solid or semi-solid condition to expose it on the calcining hearth or floor of the furnace to the intense heat of the flames playing over this hearth, while stirring or working the material from time to time in order to expose all portions of it to the heat, whereby all ligneous, mucilaginous, and other combustible impurities are burned out and the calcination of the material is completed, after which the charge is shoveled out and a new charge is introduced. It has also been proposed to spray or sprinkle the solution into the furnace directly over the calcining-bed and into the stream of flames and gases of combustion, in order to evaporate the water and cause the alkaline or other matter to fall in flakes upon the hearth, where it is stirred or manipulated to complete its calcination. Both of these methods are necessarily intermittent in their operation and are consequently slow and expensive.

A method and apparatus for effecting the evaporation and subsequent calcination of alkaline solutions by a continuous process has been disclosed and claimed by me in an application for patent filed September 20, 1889, Serial No. 324,551.

My present invention provides an improved method and apparatus for effecting calcination by a continuous process, and which in some respects resembles or is in part identical with that claimed in my said previous application.

According to my present invention I introduce the alkaline or other liquid into the top or upper part of an upright stack, chamber, or flue through which the flames or gases of combustion from a furnace are ascending, so that the liquid thus introduced descends through the stack and during its descent is acted upon by the heat of the gases and its volatile constituents are evaporated. The liquid may be sprinkled or showered into the upper part of the stack; but as this method is attended with the disadvantage that the falling particles of liquid tend to carry down the gases with them and thereby check or decrease the draft of the furnace I prefer to introduce the liquid against the walls of the stack which confine the ascending stream of gases so that the solution flows down these walls in a liquid film sufficiently thin to be exposed fully to the heat of the gases, so that by the time the liquid reaches the bottom of the stack it is concentrated to a considerable density, being preferably only of sufficient liquidity to insure that it shall continue to flow. I provide, further, for the evaporation of the liquid by raising it before its introduction into the upper part of the stack to a high temperature, and I utilize for this purpose the waste heat radiated from the stack and at the same time prevent the overheating of the walls thereof and the burning of the alkaline material upon their inner surfaces by constructing the stack with double walls, forming an annular chamber or jacket between them, into which jacket, at the bottom, the liquid to be treated is introduced and caused to flow upwardly therethrough and to overflow from the top thereof and stream down the inner walls in contact with the ascending gases.

My invention provides, also, for spraying or injecting the liquid to be treated across the ascending stream of gases and against the walls of the stack, so that the liquid shall come in contact with all portions of the ascending gases before the latter escape from the stack and utilize the otherwise waste heat thereof.

The calcining-furnace is so constructed that the concentrated liquid on reaching the bottom of the stack is received onto a hearth, where it rests in a bath, and flows gradually along the hearth, being further concentrated by the passage of the flames and gases of combustion over its surface, and finally flows over a dam onto the "calcining-hearth," properly so called, of the furnace, on which it is stirred and worked by tools inserted through suitable windows or openings in the walls of the furnace. This hearth is constructed to slope upwardly from said dam and toward the discharge end of the furnace, so that the portions of the material which are still liquid will continually run back toward the dam and separate themselves from those portions which are sufficiently solid to be properly worked or stirred by the tools. The material is gradually moved up the incline and onto a level portion of the hearth or onto a portion which slopes in the opposite direction. On the calcining-hearth the material is subjected to the intense heat from the flames which are playing over it, and all ligneous, mucilaginous, and other combustible constituents are burned out of it, leaving the purified alkaline or basic material in a fully-calcined condition.

In case my invention is applied to the manufacture of sodium sulphate the roasting of the salt-cake is effected on the calcining-hearth, along which it is moved until it reaches the downwardly-sloping portion of the hearth, where it is gradually fused by the greater heat of the flames, and it flows into a vat or pit constructed in the masonry, from which the liquefied sodium sulphate may be tapped off and conducted outside of the furnace, as desired.

Having thus described my improved process, I will now proceed to describe, with reference to the accompanying drawings, the novel apparatus which I have invented for practicing this process.

Figure 1 of the accompanying drawings is a vertical mid-section of my improved calcining-furnace in its preferred and complete form. Fig. 2 is an enlarged fragmentary section of the upper part of the stack. Fig. 3 is a plan of the portion of the stack shown in Fig. 2. Fig. 4 is an enlarged detail view of the parts of the injecting-nozzle. Fig. 5 is an enlarged fragmentary view of the furnace, showing the dam or bridge-wall. Fig. 6 is a fragmentary vertical section showing a portion of the stack in a furnace of modified construction. Fig. 7 is a vertical longitudinal section of another modified construction of furnace.

The furnace consists, essentially, of two parts, a horizontal calcining-furnace A and a vertical stack B, the two being preferably connected together, so that the stack forms a continuation of the horizontal furnace. The calcining-furnace A consists of a long low chamber having a series of doors or openings $a\ a$ in its opposite sides and formed with a flat bottom or floor to constitute the calcining-hearth C. The openings $a\ a$ are closed by suitable doors or in any other known way, and are so arranged as to admit of the insertion of stirring bars, hoes, or paddles in order to stir or manipulate the material on the calcining-hearth and to move the material along from time to time. The end of the furnace A, which communicates with the stack B, is the receiving end and the opposite end is the discharge end. At the discharge end the furnace is constructed with a grate or fire-bed $b$, on which the fuel may be burned, with a feeding-door $c$ and an ash-pit $d$, as is usual in furnaces; or in lieu thereof it may be constructed with a nozzle for injecting gas in the manner commonly practiced in the burning of natural gas. Such a nozzle is shown at the opposite end of the furnace, where it is designated by the letter $e$. In either case the flames or gases of combustion from the fuel are caused to flow longitudinally through the horizontal furnace A to the stack B, and they pass close over the calcining-hearth. The air to support combustion may be admitted by being drawn through a flue $f$, extending longitudinally of the furnace beneath the hearth C. The hearth of the furnace is divided into three or four different portions, of which the first toward the receiving end of the furnace constitutes a shallow vat for holding a bath of liquid under treatment. This portion (lettered D) extends from the receiving end beneath the stack to a dam or liquid bridge-wall $g$, which holds the bath of liquid, so that only the portion of the liquid which flows over it can reach the hearth beyond. This dam or bridge-wall is made of trough shape, as shown best in Fig. 5, so that it shall become filled with the liquid and protected thereby from the destructive influence of the heat. The second portion of the hearth C, which constitutes the beginning of the "calcining-hearth" properly so called, is formed with a rising incline and is designated by the letter $C'$. At the top of this incline the hearth is preferably extended level for some distance, this portion of the hearth being designated by $C^2$. The final portion of the hearth (designated by $C^3$) is formed with a downward incline leading from the level or higher portion and terminating in a receiving vat or pit E, which is at the discharge end of the furnace. From this vat a tapping-off opening $h$ leads out through the side wall of the furnace in order that fused matter contained in it may be drawn off. The roof of the furnace is preferably constructed with a downward projection at $i$, in order to direct the flames downwardly, so that they impinge upon the sloping portion $C^3$ of the hearth, in order that the heat at this portion may be the most intense and sufficient to fuse the matters which are to be received in the vat.

The upright portion or stack B of the furnace passes vertically from the receiving end thereof and extends to any suitable height, being constructed in general after the manner of a chimney or smoke-stack. It is preferably circular in form. Its lower portion (designated by the letter $j$) is built of masonry; but its upper portion is preferably built of sheet iron, steel, or other metal, (designated by $k$.) Outside of this is another sheet-iron tube $l$, so that between the two is formed a liquid space or jacket $m$. The inner wall $k$ of the stack extends uninterruptedly to the height at which it is desired to introduce the liquid to be treated, while the outer wall extends somewhat higher, as shown in Figs. 1 and 2. The refuse soda from a pulp-mill or other liquid to be treated is introduced at the bottom of the jacket $m$, which constitutes a liquid-reservoir, by means of a pipe $p$, controlled by a valve. The liquid ascends through the jacket or reservoir $m$ and in so doing absorbs the heat conducted through the inner wall $k$, and is thereby raised to a high temperature, while at the same time protecting this wall from injury by the heat from the ascending flames or gases. On arriving at the top of the wall $k$ the liquid overflows the latter and streams down its inner surface in a thin liquid film in contact with the ascending hot gases. Being already at a high temperature, its water and other volatilizable constituents are readily vaporized by the heat and carried off with the outflowing gases. The height at which the liquid is introduced is so proportioned to its volume and the heat of the ascending gases that the liquid is concentrated during its descent to the requisite density and reaches the receiving end of the hearth in a condition as dense as will enable it to flow. The descending film of liquid has little or no effect in retarding the ascending flow of the gases, so that it does not obstruct the draft. The upper edge of the inner wall $k$ should be perfectly level or at a uniform height on all sides in order that the film of overflowing liquid shall be of equal thickness on all sides of the stack. This, however, is practically difficult of accomplishment, and in order to provide means for regulating at will the flow of the liquid at the different sides or portions of the stack I provide for an independent admission of the liquid which is under control of an operator stationed at or near the top of the stack, where he may examine or test the flow. To this end I provide an annular trough F somewhat above the top of the wall $k$, the inner wall of which trough does not extend so high as the outer wall, so that the liquid introduced into the trough will overflow on the inner wall and flow or drip therefrom or from a downwardly-projecting bead $n$ at the bottom thereof onto the wall $k$, the upper edge of which is flared outwardly to form a surface for receiving the drip from this bead $n$. The trough F is subdivided by radial partitions $q$ into sections, as shown in Fig. 3, each of which is supplied with liquid through an independent valved pipe $r$, these several pipes leading from an annular pipe $s$, Fig. 3, which is supplied with the liquid through a pipe $s'$. When the operator finds that the flow from the reservoir $m$ over the top of the inner wall $k$ is inadequate on any side, he will, by opening one or more of the valves $r$, admit a sufficient quantity of liquid into the compartment or compartments of the trough F directly above the portion of the inner wall $k$, which is insufficiently supplied with liquid and thereby cause the liquid supplied to this compartment or compartments to overflow the inner wall of the trough and drip from the bead $n$ thereof onto the wall $k$. A circular gallery or balcony G is provided in order that the operator may be able to walk around the stack to inspect the flow of the liquid and operate the cocks $r$ $r$.

In order to provide a greater surface for the streaming down of the liquid within the stack than that afforded by the cylindrical outer wall thereof and in order, also, to utilize the heat in the core or central portion of the ascending stream of gases, I construct the stack with a vertical pillar B', arranged concentrically within it and extending nearly to its top. The lower portion of this pillar is of masonry $j'$, while its upper portion is constructed of a tube of iron or steel sheet or plate $k'$, closed at its bottom to constitute a reservoir (lettered $m'$) for the liquid under treatment. The liquid is admitted to the bottom of this reservoir through a valved pipe $p'$, and it ascends through the reservoir and overflows at the open top thereof, so that it streams down the exterior surface of the metal tube or wall $k'$ and the exterior of the masonry column $j'$, being thereby concentrated in the same manner as the liquid which streams down the wall $k$.

In order to utilize as fully as possible the heat of the ascending gases before their escape from the chimney and the stack, I provide for throwing a thin sheet or film or spray of liquid radially outward across the ascending stream of gases. For this purpose a spray-valve H is used, consisting of a fixed disk $t$ and a movable disk $t'$, the latter pressed elastically against the disk $t$. The liquid to be sprayed is forced in between these disks under sufficient pressure to cause it to slightly unseat the lower disk and fly out in the form of a film or spray through the narrow space between them. The liquid is supplied to the space between the disks through a pipe $u$, a rod or screw $u'$, connected to the disk $t'$, passing out through the vertical portion of this pipe and projecting above it, where it receives the pressure of a spring $u^2$, adjustable by the nuts $u^3$. To prevent leakage or the necessity of passing the rod through a stuffing-box, this spring may advantageously be housed within an expansible chamber $u^4$, the top and bottom heads of which are composed of flexible diaphragms. These features of construction are clearly shown in Fig. 4. In those instances where the draft is sufficiently strong to admit of it I provide for further utilizing the heat of the ascending gases by causing a spray or rain of liquid to flow through the annular space midway between the walls $k$ and $k'$. This spray or rain is indicated at $x$ in Fig. 2. It issues from an annular pipe $v$, preferably on its lower side and connected through branches $v'$ to a pipe $v^2$, arranged concentrically around the pipe $u$ and supplied by a pipe $v^3$. The pipes $u$ and $v^3$ are supplied with suitable valves to regulate the flow of the liquid through them.

The liquid to be treated is supplied under sufficient pressure to force it to the desired height by means of a pump P of any suitable construction, either a centrifugal pump, as shown, or any other type, the discharge-pipe $w$ of which is divided into two branches, one of which $w'$ ascends and supplies the pipes $s'$, $v^3$, and $u$, while the other branch $w^2$ descends and supplies the pipes $p$ and $p'$.

The admission of the liquid into the stack need not necessarily be at or close to the extreme top thereof, as shown in Fig. 1, but may be at any suitable height. The stack may be continued above the point of admission of the liquid by carrying upward therefrom any suitable known construction of chimney or stack—as, for example, by means of a sheet-iron pipe—as shown in dotted lines at I in Fig. 2.

I prefer to construct the furnace with means for supplying fresh hot gases at the base of the stack, in order that if the gases from the fuel introduced at the discharge end of the furnace A have not retained sufficient heat by the time they reach the base of the stack to properly effect the concentration of the descending liquid therein they may be reinforced by introducing fresh gases into the stack. In districts where natural or other gas is available this means will consist of gas-injecting nozzles or burners, such as that shown at $e$ in Fig. 1, for admitting gas and air at any suitable point at or near the base of the stack, or, in fact, into any part of the stack wherever it may be desired to increase the heat. The burner shown at $e$ is a three-nozzle burner for injecting natural gas along with air drawn in with it by induction through the tube $e'$ in the manner well known in the use of natural gas.

That part of my invention which relates to the heating of the liquid before its introduction into the stack by causing it to flow upwardly against or along the wall of the stack may be omitted while retaining and utilizing the advantages of the other features of my invention. The central column B' may also be omitted, especially in the case of stacks of small diameter, and the introduction of the liquid to cause it to flow down the walls on the inside of the stack may be effected otherwise than by causing it to overflow the top of a wall or partition.

Fig. 6 illustrates one application of these modifications. The stack is of masonry and has built into it at any suitable distance below its top an annular trough F of the same construction as the trough F shown in Figs. 2 and 3. The liquid is admitted simultaneously to all the different compartments of this trough by opening the valves $r\,r$ thereof, and it overflows the inner wall of the trough and streams thence down the inner surface of the wall of the stack. If the flow is unequal at different sides of the stack, it may be equalized by suitably adjusting the valves $r\,r$.

Fig. 7 illustrates another application of these modifications. The stack B is here built of masonry and is supplied with liquid by means of a spray-valve H of the same construction as that shown in Fig. 4, by which the liquid is thrown in a sheet or spray with sufficient force to cause it to reach the side walls of the stack, to which it clings and down which it flows in a film. The gases of combustion pass from the stack B into a lateral flue $B^2$ and up through a secondary stack $B^3$ before escaping to the atmosphere.

The operation of the apparatus shown in the drawings in connection with the recovery of wood-pulp liquors or other alkaline solutions will be sufficiently obvious from the description thereof already given.

My improved calcining-furnace is well adapted for use in the manufacture of sodium sulphate (Glauber's salts) from sodium chloride and sulphuric acid. The first stage in the operation—namely, the production of the "salt cake" or acid sodium sulphate—may be accomplished according to any method heretofore followed and the salt cake be placed on the calcining-hearth of the furnace A, or a solution of the acid-sodium sulphate may be introduced into the bath D. The operation is then the same as in the treatment of an alkaline solution, the material being worked up the inclined portion C' of the hearth and exposed thereon to the heat of the flames playing over it and continually stirred until it is thoroughly roasted and reduced to powder. Instead, then, of being taken out through one of the openings $a$, it is pushed over onto the downward incline $C^3$, where it receives the most intense heat from the flames, which are directed by the bridge-wall directly onto this portion of the hearth, the heat thus acquired being sufficient to fuse the sodium sulphate, which thereupon flows into the vat E, in which it is maintained fused and from which it may be drawn off through the opening $h$.

Whenever burning gases are referred to in this specification, they are to be understood as referring either to injected gases or to the gases emanating from solid or liquid fuel during combustion.

The specific arrangement and details of construction of my improved furnace may be greatly varied without departing from the essential features of my invention, which will be recited in the claims. Examples of such structural variations will be found in my before-recited application, Serial No. 324,551.

I claim as my invention the following-defined novel features and combinations, substantially as hereinbefore set forth, namely:

1. The process consisting in introducing the liquid to be treated in a concentrated condition in a bath on the calcining-hearth, subjecting said bath to the heat of gases of combustion, whereby its volatile constituents are vaporized, moving the material from said bath along the calcining-hearth while under the influence of burning gases until its combustible constituents are calcined out, and finally fusing the purified material and causing it to flow off from said hearth.

2. In a calcining-furnace, the combination of an upright stack, an inlet for gases of combustion at its lower part, so that the gases ascend therethrough, a liquid-reservoir constructed as part of said stack and having a passage from the upper part of said reservoir into the stack, whereby the liquid to be treated is heated in said reservoir and discharged thence into the stack to descend therethrough.

3. In a calcining-furnace, the combination of an upright stack constructed in part of double walls constituting a liquid jacket or reservoir between them, and the inner wall ascending to less height than the outer wall and having a pipe for introducing the liquid to be treated into the lower part of said reservoir, whereby the liquid is caused to ascend through said reservoir and overflow the top of the inner wall into the stack.

4. In a calcining-furnace, the combination of an upright stack, an annular trough or liquid-vessel constructed in the upper part of said stack, and a pipe for introducing the liquid to be treated into said trough and causing it to overflow therefrom within the stack.

5. In a calcining-furnace, the combination of an upright stack, an annular liquid-vessel or trough constructed at the upper part thereof and divided into compartments, and separate valved liquid-inlet pipes communicating with the respective compartments.

6. In a calcining-furnace, the combination of the upright stack thereof through which pass hot gases of combustion from the furnace, with a spray-valve within the upper part of said stack constructed to throw a spray of liquid to be treated across the stream of ascending gases and against the walls of the stack, whereby the liquid is exposed to the gases first in the form of spray and subsequently while streaming down said walls.

7. In a calcining-furnace, the combination of an upright stack with a vertical column arranged within it and an inlet for the liquid to be treated constructed to flow said liquid against the sides of said column and cause it to stream down the surface thereof.

8. In a calcining-furnace, the combination of an upright stack with a vertical column therein, constructed in part as a heating-reservoir for the liquid to be treated, with the top of said reservoir open to admit the liquid to overflow therefrom down the outer sides of the column, and an inlet-pipe for admitting liquid to the lower part of said reservoir to cause it to ascend therethrough.

9. A calcining-furnace consisting of a horizontal chamber having a calcining hearth or floor, an inlet for the gases of combustion at the discharge end thereof and an outlet therefor at the receiving end, a bath at the receiving end for the concentrated liquid to be treated, and a calcining-hearth constructed to ascend from said bath toward the discharge end of the furnace, and the chamber constructed with doors or openings for the insertion of stirring-tools by which to push the material being calcined up said inclined portion of the hearth.

10. A calcining-furnace consisting of a horizontal chamber having a long calcining hearth or floor and constructed with a pit or vat for receiving fused material at the discharge end of the chamber and with the portion of the hearth adjacent to said pit constructed to slope toward the pit, an inlet for gases of combustion at the discharge end of the chamber and an outlet therefor at the receiving end, and the chamber shaped to direct the gases flowing over the calcining-hearth to impinge upon and impart the most extreme heat to the downwardly-inclined portion thereof, so that the calcined material may be fused thereon and caused to drain into said pit.

In witness whereof I have hereunto signed my name in the presence of two subscribing witnesses.

HENRY BLACKMAN.

Witnesses:
   A. L. WRIGHT,
   C. E. SHIPLEY.